US009585183B2

(12) United States Patent  
Suzuki

(10) Patent No.: US 9,585,183 B2  
(45) Date of Patent: Feb. 28, 2017

(54) COMMUNICATION APPARATUS AND COMPUTER PROGRAM THEREOF

(71) Applicant: BROTHER KOGYO KABUSHIKI KAISHA, Nagoya, Aichi (JP)

(72) Inventor: Satoshi Suzuki, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 15/078,135

(22) Filed: Mar. 23, 2016

(65) Prior Publication Data

US 2016/0286592 A1    Sep. 29, 2016

(30) Foreign Application Priority Data

Mar. 27, 2015   (JP) .................................. 2015-066069

(51) Int. Cl.
   *G06F 3/12*      (2006.01)
   *H04W 76/02*     (2009.01)
   *H04W 24/10*     (2009.01)

(52) U.S. Cl.
   CPC ........ *H04W 76/023* (2013.01); *G06F 3/1203* (2013.01); *G06F 3/1236* (2013.01); *G06F 3/1292* (2013.01); *H04W 24/10* (2013.01)

(58) Field of Classification Search
   None
   See application file for complete search history.

(56) References Cited

U.S. PATENT DOCUMENTS

| 2008/0145089 | A1* | 6/2008 | Takahashi | G03G 15/50 399/74 |
| 2015/0293592 | A1* | 10/2015 | Cheong | G06F 3/016 345/173 |
| 2016/0261769 | A1* | 9/2016 | Yamada | H04N 1/4406 |

FOREIGN PATENT DOCUMENTS

JP          H07-154848          6/1995

OTHER PUBLICATIONS

Wi-Fi Peer-to-Peer (P2P) Technical Specification, Wi-Fi Alliance Technical Committee P2P Task Group, Version 1.1 (159 pages) (2010).

* cited by examiner

*Primary Examiner* — David Bilodeau
(74) *Attorney, Agent, or Firm* — Scully, Scott, Murphy & Presser, PC

(57) ABSTRACT

A non-transitory computer-readable storage medium may store computer-readable instructions for a communication apparatus, wherein the computer-readable instructions, when executed by a processor of the communication apparatus, cause the communication apparatus to perform: obtaining first and second radio field intensities from the first external apparatus; calculating a first value indicating a ratio of the first and the second radio field intensities; obtaining third and fourth radio field intensities from the second external apparatus after receiving the third predetermined signal; calculating a second value indicating a ratio of the third and fourth radio field intensities; specifying a relationship between first and second distances by using the first and second values, the first distance being a distance between the communication apparatus and the first external apparatus, and the second distance being a distance between the communication apparatus and the second external appara- (Continued)

tus; and outputting target data by using the specified relationship.

17 Claims, 5 Drawing Sheets

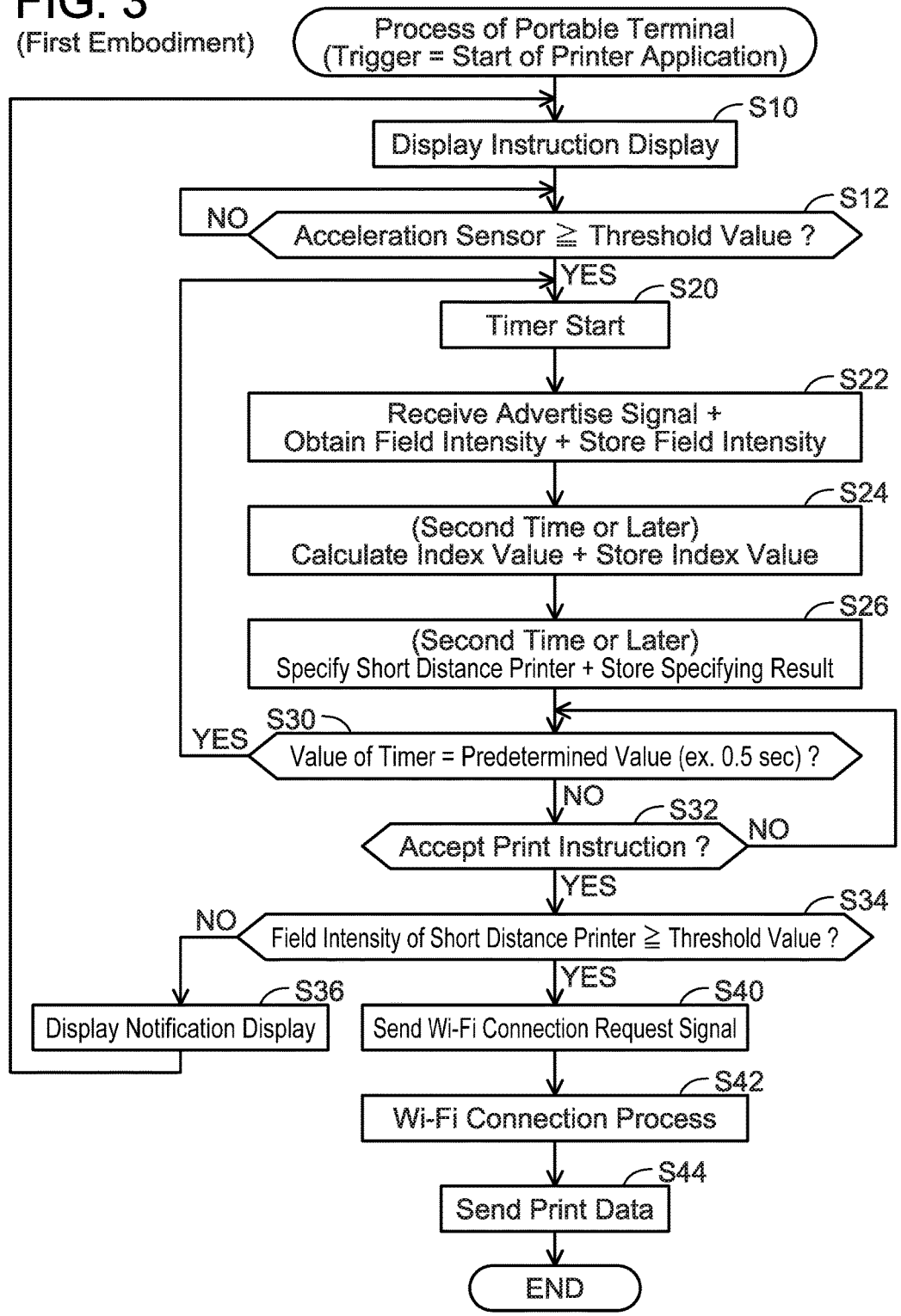

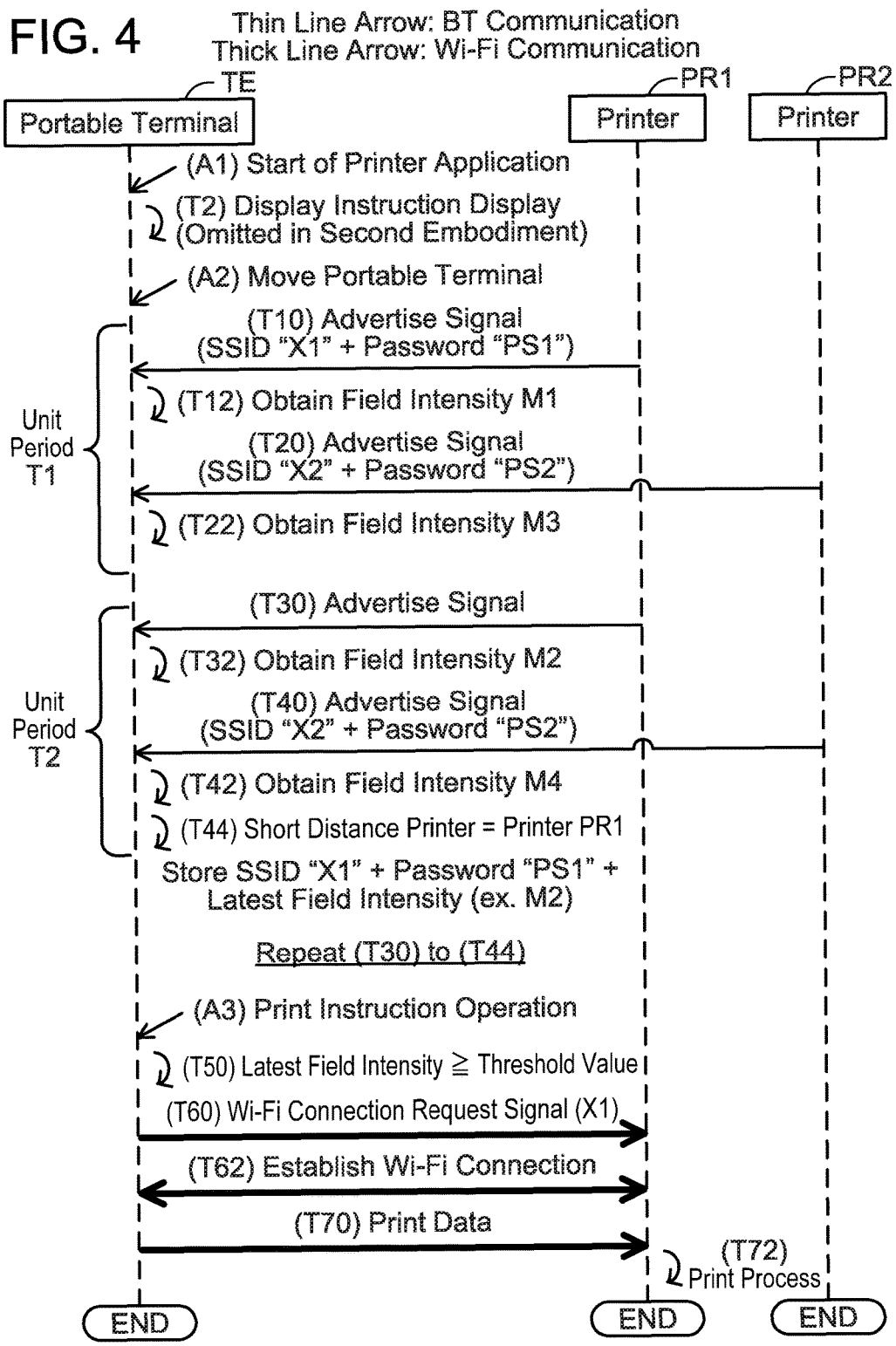

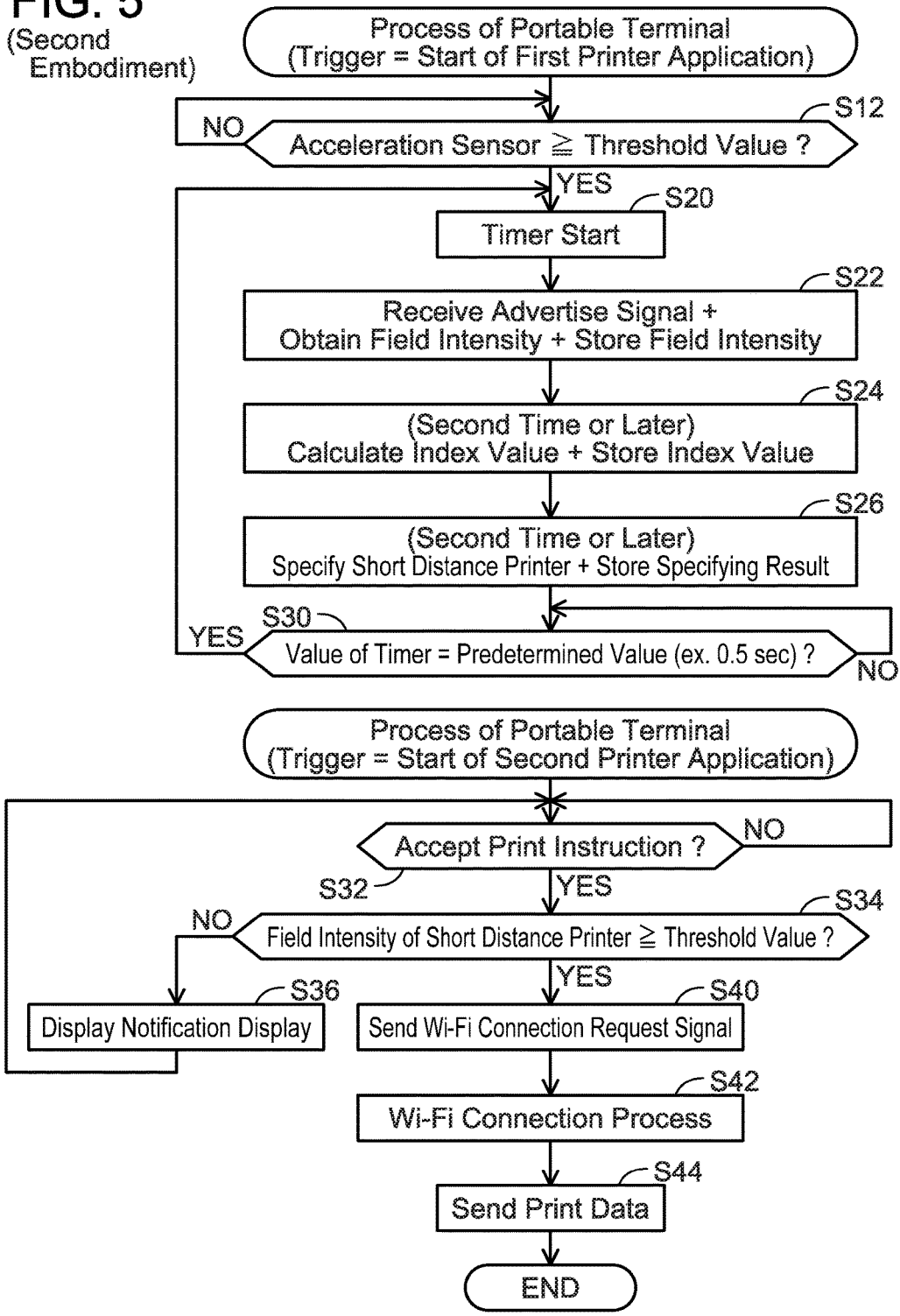

COMMUNICATION APPARATUS AND COMPUTER PROGRAM THEREOF

CROSS-REFERENCE TO RELATED APPLICATIONS

This application claims priority to Japanese Patent Application No. 2015-066069, filed on Mar. 27, 2015, the entire contents of which are hereby incorporated by reference into the present application.

TECHNICAL FIELD

The present specification discloses technique of specifying a relationship of the distance between a communication apparatus and a plurality of external apparatuses.

DESCRIPTION OF RELATED ART

A control device connected to each of a plurality of antennas so as to be capable of communicating with them has been known. The plurality of antennas receives radio wave transmitted from each of two or more forklift trucks. The control device detects the position of each of the two or more forklift trucks based on the magnitudes of the radio field intensities of the received radio wave in the plurality of antennas.

As mentioned above, in the above-described technique, the control device can detect the positions of two or more forklift trucks. However, in the above described technique, it is necessary to provide a plurality of antennas in order to detect the position of each of forklift trucks.

SUMMARY

The present specification discloses a technique of being capable of appropriately specifying a relationship of the distance between a communication apparatus and a plurality of external apparatuses without providing a plurality of antennas.

One aspect disclosed in the present specification may be a non-transitory computer-readable storage medium storing computer-readable instructions for a communication apparatus, wherein the computer-readable instructions, when executed by a processor of the communication apparatus, cause the communication apparatus to perform: obtaining a first radio field intensity of a first predetermined signal by receiving the first predetermined signal from a first external apparatus via a first interface of the communication apparatus, the first interface being an interface for executing a wireless communication in accordance with a first communication scheme; obtaining a second radio field intensity of a second predetermined signal by receiving the second predetermined signal from the first external apparatus via the first interface after receiving the first predetermined signal; calculating a first value indicating a ratio of the first radio field intensity and the second radio field intensity; obtaining a third radio field intensity of a third predetermined signal by receiving the third predetermined signal from a second external apparatus different from the first external apparatus via the first interface; obtaining a fourth radio field intensity of a fourth predetermined signal by receiving the fourth predetermined signal from the second external apparatus via the first interface after receiving the third predetermined signal; calculating a second value indicating a ratio of the third radio field intensity and the fourth radio field intensity; specifying a relationship between a first distance and a second distance by using the first value and the second value, the first distance being a distance between the communication apparatus and the first external apparatus, and the second distance being a distance between the communication apparatus and the second external apparatus; and outputting target data of an output target by using the specified relationship.

A control method for realizing the communication apparatus is also novel and useful. Moreover, a communication system comprising the communication apparatus, the first external apparatus and the second external apparatus is also novel and useful. Moreover, a method perfhrmed by the communication apparatus is also novel and useful.

BRIEF DESCRIPTION OF DRAWINGS

FIG. 3 shows a flowchart of a process of a portable terminal of the first embodiment;
FIG. 4 shows a sequence diagram of each process executed by each device;
and
FIG. 5 shows a flowchart of processes of a portable terminal of the second embodiment.

EMBODIMENTS

First Embodiment

Configuration of Communication System 2

Figure 1:
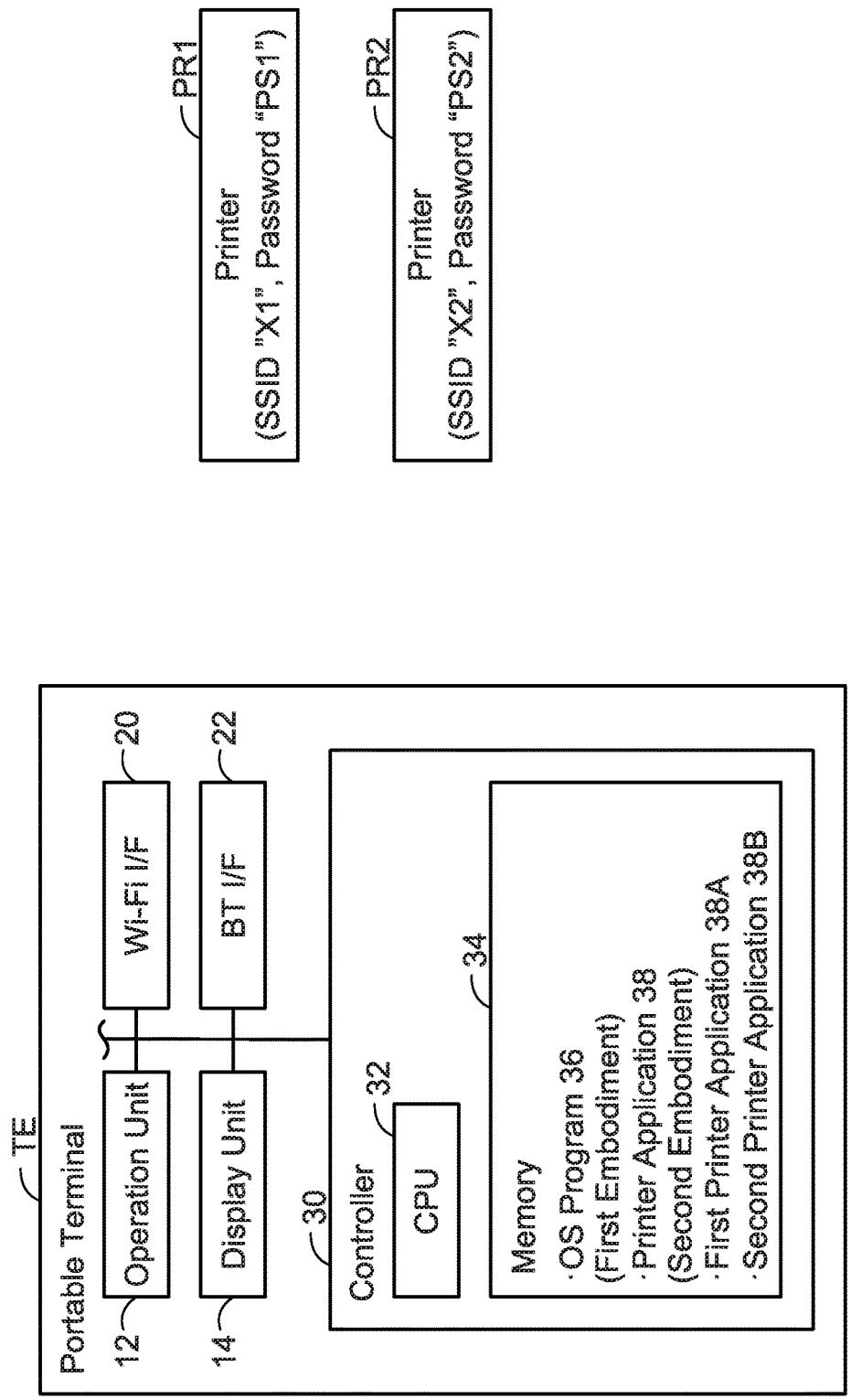
FIG. 1 shows a configuration of a communication system.

As shown in FIG. 1, a communication system 2 comprises a portable terminal TE and a plurality of printers PR1 and PR2. The portable terminal TE and each of the printers PR1 and PR2 can execute wireless communication with each other.

Configuration of Portable Terminal TE

The portable terminal TE is, for example, portable terminal apparatus such as a mobile phone (for example, a smart phone), a PDA, a notebook PC, a tablet PC, a portable music player, or a portable movie player. The portable terminal TE comprises an operating unit 12, a display unit 14, a Wi-Fi interface 20, a BT (an abbreviation for Bluetooth (registered trademark)) interface 22, and a controller 30. The units 12 to 30 are connected to a bus wire (a reference numeral is omitted). Hereinafter, the interface is referred to as an "I/F".

The operating unit 12 comprises a plurality of keys. A user can input various instructions into the portable terminal TE by operating the operating unit 12. The display unit 14 is a display for displaying various pieces of information. The display unit 14 can also function as a so-called touch panel (i.e., functions as an operating unit).

The Wi-Fi I/F 20 is an I/F for performing a wireless communication in accordance with a Wi-Fi scheme (hereinafter called "Wi-Fi communication"). The Wi-Fi scheme, for example, is a wireless communication scheme based on IEEE (abbreviation of The Institute of Electrical and Electronics Engineers, Inc.) standard 802.11, and standards conforming thereto (e.g. 802.11a, 11b, 11g, 11n, and so forth).

The BT I/F 22 is an I/F for performing a wireless communication (hereinafter called "BT communication") in accordance with a Bluetooth scheme. The Bluetooth scheme, for example, is a wireless communication scheme based on IEEE standard 802.1.5, and standards conforming thereto. More specifically, the BT I/F 22 supports BLE (abbreviation of Bluetooth (registered trademark) Low Energy). The BLE is a standard that is realized using version 4.0 or a later version of the Bluetooth scheme. Hereinafter, Bluetooth version lower than 4.0 will be called "classic BT". In order to perform a BT communication in accordance with BLE between a pair of BT I/Fs, the one BT I/F may support "Bluetooth Smart Ready" defined by the BT scheme, and the other BT I/F may support "Bluetooth Smart Ready" or "Bluetooth Smart" defined by the BT scheme. A BT I/F that supports "Bluetooth Smart Ready" is an I/F that is capable of performing both an operation in accordance with BLE and an operation in accordance with classic BT (i.e. a so-called dual mode I/F). A BT I/F that supports "Bluetooth Smart" is an I/F that is capable of performing the operation in accordance with BLE, but is not capable of performing the operation in accordance with classic BT. In the present embodiment, a BT communication in accordance with BLE is performed between the portable terminal TE and the printers PR1 and PR2. Then, since the BT I/F 22 of the portable terminals TE supports "Bluetooth Smart Ready", the BT I/F (not shown) of each of printers PR1 and PR2 may support any of "Bluetooth Smart Ready" and "Bluetooth Smart". However, in a variation, the BT L/F 22 of the portable terminal TE may support "Bluetooth Smart" when the BT I/F of each of the printers PR1 and PR2 supports "Bluetooth Smart Ready".

The points of difference between classic BT and BLE will be described. The number of BLE channels (i.e. 40) is smaller than the number of classic BT channels (i.e. 79). Current consumption at the time of a BLE data communication (e.g. 15 mA) is less than the current consumption at the time of a classic BT data communication (e.g. 35 mA). Therefore, BLE power consumption is lower than the power consumption of the classic BT. Also, an Advertise signal is used in BLE, but an Advertise signal is not used in classic BT.

The points of difference between the Wi-Fi scheme and the BT scheme will be described. The communication speed of a Wi-Fi communication (e.g. a maximum communication speed of 600 [Mbps]) is faster than the communication speed of a BT communication (e.g. maximum communication speed of 24 [Mbps]). The frequency of the carrier wave in a communication is either a 2.4 [GHz] range or a 5.0 [GHz] range. The frequency of the carrier wave in a BT communication is the 2.4 [GHz] range. That is, in a case where the 5.0 [GHz] range is used as the carrier wave frequency in a Wi-Fi communication, the carrier wave frequency in the Wi-Fi communication differs from the carrier wave frequency in the BT communication. Furthermore, the maximum distance over which a Wi-Fi communication can be performed (e.g. approximately 100 [m]) is greater than the maximwn distance over which a BT communication can be performed (e.g. approximately several tens [m]).

The controller 30 comprises a CPU 32 and a memory 34. The CPU 32 executes various processes according to programs 36 and 38 stored in the memory 34. The memory 34 is composed of a volatile memory, a non-volatile memory, and the like. The memory 34 stores not only an OS program 36 for achieving the basic operation of the portable terminal TE but also a printer application 38. The printer application 38 is an application for causing each of the printers PR1 and PR2 to execute a print function. The printer application 38 may be installed in the portable terminal TE from a server on the Internet provided by a vender of each of the printers PR1 and PR2 or may be installed into the portable terminal TE from a medium shipped together with each of the printers PR1 and PR2, for example.

Configurations of Printers PR1 and PR2

Each of the printers PR1 and PR2 is peripheral apparatus which can execute a print function, i.e., peripheral apparatus of a portable terminal TE or the like. Each of the printers PR1 and PR2 can execute Wi-Fi communication and BT communication. Specifically, each of the printers PR1 and PR2 supports the WFD (an abbreviation for Wi-Fi Direct (registered trademark)) scheme designed by the Wi-Fi Alliance. The WFD scheme is a wireless communication scheme described in the specification "Wi-Fi Peer-to-Peer (P2P) Technical Specification Version 1.1" produced by the Wi-Fi Alliance.

The printer PR1 operates in the G/O (an abbreviation for Group Owner) state of the WFD scheme when the power is turned ON. As a result, the printer PR1 operates as a parent station of a wireless network in accordance with the Wi-Fi scheme. Moreover, the printer PR1 stores Wi-Fi setting information which should be used in the wireless network in which the printer PR1 operates as a parent station. The Wi-Fi setting information includes an SSID (an abbreviation for Service Set Identifier) "X1" and a password "PS1". The SSID is a unique ID for identifying the wireless network. The password is a character string used for authenticating and encryption in the wireless network.

The printer PR2 also operates in the G/O state of the WFD scheme when the power is turned ON. As a result, the printer PR2 operates as a parent station of the wireless network in accordance with the Wi-Fi scheme. Moreover, the printer PR2 stores Wi-Fi setting information which should be used in the wireless network in which the printer PR2 operates as a parent station. The Wi-Fi setting information includes an SSID "X2" which is different from the SSID "X1" and a password "PS2" which is different from the password "PS1".

Figure 2:
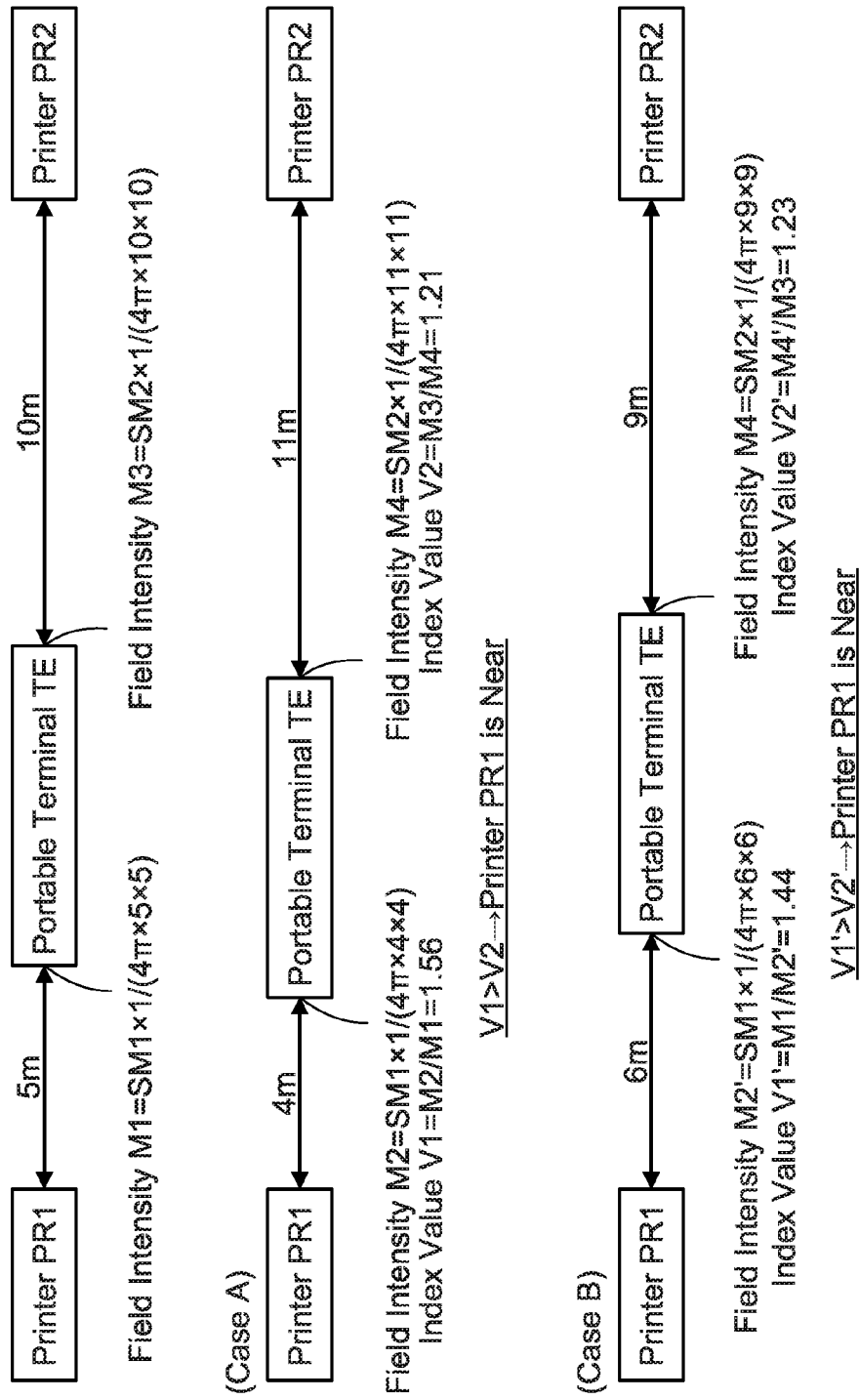
FIG. 2 shows illustrations for specifying a short distance printer.

Method for Specifying Short Distance Printer by Portable terminal TE; FIG. 2

A method in which a portable terminal TE specifies a short distance printer which is a printer closest to the portable terminal TE from among a plurality of printers PR1 and PR2 is described with reference to FIG. 2. In the present embodiment, an attenuation in radio field intensity, proportional to the square of the distance between the source and the destination of radio wave, is used.

In the top illustration in FIG. 2 (hereinafter referred to as the "initial state"), the distance between the portable terminal TE and the printer PR1 is 5 [m], and the distance between the portable terminal TE and the printer PR2 is 10 [m]. In the initial state, the portable terminal TE executes BT communication and receives an Advertise signal from the printer PR1. In this case, the radio field intensity (hereinafter referred to as the "radio field intensity on receiving") M1 of the Advertise signal at the time of receiving in the portable terminal TE is represented by the mathematical expression "SM1×1/(4π×5 [m]×5 [m])". In the mathematical expression, SM1 indicates a radio field intensity (hereinafter referred to as the "radio field intensity on sending") of the Advertise signal at the time of sending in the printer PR1. As shown in the mathematical expression, the radio field intensity on receiving M1 shows a value of the radio field intensity on sending SM1 attenuated in proportion to the square of the distance (i.e., 5 [m]). In the present embodiment, as the unit of the radio field intensity, not the decibel represented by the logarithm, but the unit (for example, voltage (volt), current (ampere), electric power (watt), or the like) represented by decimal is used. In the same way, the portable terminal TE executes BT communication and receives an Advertise signal from the printer PR2. In this case, a radio field intensity on receiving M3 in the portable terminal TE is represented by the mathematical expression "SM2×1/(4π×10 [m]×10 [m])". In the mathematical expression, SM2 indicates a radio field intensity on sending in the printer PR2.

If the radio field intensity on sending SM1 in the printer PR1 is equal to the radio field intensity on sending SM2 in the printer PR2, the portable terminal TE compare each of the radio field intensities on receiving M1 and M3 obtained in the initial state and can specify the printer PR1 corresponding to the larger radio field intensity on receiving M1 as a short distance printer. However, for example, if the kinds of chips of the BT I/Fs mounted in the printers PR1 and PR2 are different from each other, the radio field intensities on sending SM1 and SM2 may not be identical. Moreover, for example, even if the kinds of chips of the BT I/Fs mounted in the printers PR1 and PR2 are the same, when the shapes of the cases of the printers PR1 and PR2, the positions at which the BT I/Fs are arranged, or the like are different from each other, the radio field intensities on sending SM1 and SM2 may not be identical. Therefore, the portable terminal TE may not appropriately specify a short distance printer even by simply comparing the receiving radio field intensities M1 and M3. For example, in the initial state of FIG. 2, in the case where SM2 is a value larger than SM1, the portable terminal TE may erroneously specify the printer PR2 as a short distance printer.

Considering the circumstances, the portable terminal TE of the present embodiment specifies a short distance printer as follows. For example, as shown in the case A, the condition where the portable terminal TE moves 1 [m] away from the printer PR2 and comes 1 [m] close to the printer PR1, compared with the initial state, is assumed. In this state, the portable terminal TE further executes BT communication and receives an Advertise signal from the printer PR1. In this case, the radio field intensity on receiving M2 in the portable terminal TE is represented by the mathematical expression "SM1×1/(4π×4 [m]×4 [m])" Moreover, the portable terminal TE further executes BT communication and receives an Advertise signal from the printer PR2. In this case, the radio field intensity on receiving M4 in the portable terminal TE is represented by the mathematical expression "SM2×1/(4π×11 [m]×11 [m])".

The portable terminal TE calculates an index value V1 (=1.56) by dividing a larger value M2, from among the two radio field intensities on receiving M1 and M2 corresponding to the printer PR1, by a smaller value M1. The portable terminal TE calculates an index value V2 (=1.21) by dividing a larger value M3, from among the two radio field intensities on receiving M3 and M4 corresponding to the printer PR2, by a smaller value M4. The portable terminal TE then compares the index values V1 and V2 and specifies the printer PR1 corresponding to the larger index value V1 as a short distance printer. Each of the index values V1 and V2 is a value obtained by removing a component of each of the radio field intensity on sending SM1 and SM2 and indicates the rate of change between the radio field intensity on receiving in the initial state and the radio field intensity on receiving in the state of the case A. Considering the attenuation in radio field intensity in proportion to the square of the distance, the printer PR1 having a larger rate of change in radio field intensity on receiving is present in a closer position to the portable terminal TE, compared with the printer PR2 having a smaller rate of change in radio field intensity on receiving. Therefore, the portable terminal TE can appropriately specify the printer PR1 as a short distance printer even in the condition where the radio field intensity on sending SM1 is different from the radio field intensity on sending SM2.

Even when three or more printers are present, the portable terminal TE can specify a short distance printer in the same manner. That is, the portable terminal TE can calculate three or more index values corresponding to the three or more printers and can specify a printer corresponding to the largest index value from among the three or more index values as a short distance printer. In the present embodiment, the portable terminal TE calculates the index value by dividing a larger value from among two radio field intensities on receiving, by a smaller value. However, in variations, the portable terminal TE may calculate the index value by dividing a smaller value from among two radio field intensities on receiving, by a larger value. In this case, the portable terminal TE is only necessary to specify a printer corresponding to the smallest index value as a short distance printer. Generally, the portable terminal TE is only necessary to specify a short distance printer using an index value indicating a ratio between two receiving radio field intensities.

For example, as shown in the case B, the condition where the portable terminal TE moves 1 [m] away from the printer PR1 and comes 1 [m] close to the printer PR2, compared with the initial state, is assumed. In this state, the portable terminal TE further executes BT communication and receives an Advertise signal from the printer PR1. In this case, the radio field intensity on receiving M2' in the portable terminal TE is represented by the mathematical expression "SM1×1/(4π×6 [m]×6 [m])". The portable terminal TE further executes BT communication and receives an Advertise signal from the printer PR2. In the case, the radio field intensity on receiving M4' in the portable terminal TE is represented by the mathematical expression "SM2×1 (4π×9 [m]×9 [m])".

The portable terminal TE calculates an index value V1' (=1.44) by dividing a larger value M1, from among the two radio field intensities on receiving M1 and M2' corresponding to the printer PR1, by a smaller value M2'. The portable terminal TE calculates an index value V2' (=1.23) by dividing a larger value M4', from among the two radio field intensities on receiving M3 and M4' corresponding to the printer PR2, by a smaller value M3. The portable terminal TE then compares the index values V1' and V2' and specifies the printer PR1 corresponding to the larger index value V1' as a short distance printer. In this way, even when the portable terminal TE moves so as to be close to the printer PR1 as shown in the case A or moves so as to be close to the printer PR2 as shown in the case B, the portable terminal TE can appropriately specify a short distance printer (i.e., the printer PR1).

The portable terminal TE establishes a wireless connection in accordance with the Wi-Fi scheme with the short distance printer after specifying the short distance printer. The portable terminal TE then can execute Wi-Fi communication, send print data to the short distance printer, and cause the short distance printer to execute printing.

Processes of Portable Terminal TE; FIG. 3

The details of the processes which are executed by the CPU 32 of the portable terminal TE in accordance with a printer application 38 is described below with reference to FIG. 3. The CPU 32 starts the processes of FIG. 3 in a case where the printer application 38 is started by a user.

In S10, the CPU 32 displays an instruction screen on a display unit 14. The instruction screen is a screen for instructing the user to move the portable terminal TE and, for example, includes a message "please move the portable terminal from side to side" or the like. When the user moves the portable terminal TE according to the instruction screen, the distances between the portable terminal TE and each of the printers PR1 and PR2 change. Thus, as illustrated in FIG. 2, the portable terminal TE can appropriately calculate the index value that is the rate of change in the radio field intensity on receiving. Hereinafter, the radio field intensity on receiving is merely referred to as the "radio field intensity".

In S12, the CPU 32 monitors that a value of acceleration obtained by an acceleration sensor (not shown) mounted on the portable terminal TE becomes a threshold value or more. The threshold value in S12 is a relatively small value by which the movement of the portable terminal TE can be detected. When the user moves the portable terminal TE according to the instruction screen in S10, the CPU 32 determines that the value of the acceleration is the threshold value or more, (YES in S12) and proceeds to S20. On the other hand, in a case where the value of acceleration is less than the threshold value (NO in S12), the CPU 32 does not proceed to S20 and subsequent processes. In order to appropriately calculate the index value, the position of the portable terminal TE should change. Since the portable terminal TE cannot appropriately calculate the index value in a case where the value of acceleration is less than the threshold value, the portable terminal TE does not execute S20 and subsequent processes. As a result, a processing load of the portable terminal TE can be reduced.

In S20, the CPU 32 starts a timer. Subsequently, in S22, the CPU 32 receives an Advertise signal via BT I/F 22 from a printer (for example, PR1) around the portable terminal TE. The advertise signal is a signal for notifying surrounding devices of the presence of the printer and is repeatedly broadcast-transmitted from the printer while the power of the printer is ON. The Advertise signal is a signal received from the printer without establishing a logical link of the Bluetooth scheme (i.e., a wireless connection of the Bluetooth scheme). More specifically, the Advertise signal is a signal received from the printer without executing communication of a layer higher than the L2CAP layer, by executing communication of a layer lower than the L2CAP layer (i.e., a Link Manager layer or Link layer) in the protocol stack of Bluetooth. The L2CAP layer is the highest layer for establishing a logical link of Bluetooth. That is, the Advertise signal is received from the printer without executing communication of the highest layer for establishing a logical link, by executing communication of a layer lower than the highest layer. In this way, th portable terminal TE can avoid establishing a logical link (i.e., a BT connection) with the printer. As a result, a communication load between the portable terminal TE and the printer can be reduced. In the present embodiment, the Advertise signal is repeatedly broadcast-transmitted every 0.2 second on a regular basis. In variations, an interval of transmitting the Advertise signal may be a value other than 0.2 second.

In S22, the CPU 32 further obtains a radio field intensity of the Advertise signal (for example, a value indicating a voltage at the time of receiving the Advertise signal in a BT I/F 22 or the like), associates the obtained radio field intensity with information in the Advertise signal, and cause the memory 34 to store the radio field intensity and the information. The Advertise signal includes Wi-Fi setting information (i.e., an SSID and a password) used in the source printer. Thus, in S22, the CPU 32 associates the radio field intensity with the Wi-Fi setting information and causes the memory 34 to store the radio field intensity and the Wi-Fi setting information. In a case where two or more printers (for example, PR1 and PR2) are present around the portable terminal TE, the CPU 32 executes the process of S22 for each of the two or more printers. That is, as to each of the two or more printers, the CPU 32 associates the radio field intensity of the printer to the Wi-Fi setting information of the printer and causes the memory 34 to store the radio field intensity and the Wi-Fi setting information.

The first S24 and the first S26 after the first S22 are skipped. Subsequently, the CPU 32 repeatedly executes, in sequence, a process (S30) of monitoring that the value of timer reaches the predetermined value and a process (S32) of monitoring that a print instruction is accepted. In S30, the CPU 32 monitors that the value of time started in S20 reaches the predetermined value. The predetermined value is a relatively small value and is 0.5 second in the present embodiment. In variations, the predetermined value may be a value other than 0.5 second and is generally preferably a value larger than the interval of transmitting the Advertise signal transmitted from the printer. In a case where the value of time reaches the predetermined value (YES in S30), the CPU 32 returns to S20, and resets and restart the timer. The CPU 32 then executes the second S22, associates the radio field intensity with the Wi-Fi setting information, and causes the memory 34 to store the radio field intensity and the Wi-Fi setting information. Thus, two radio field intensities for one printer are stored in the memory 34.

In S24, as to each of the one or more printer, the CPU 32 calculates index values (for example, V1 and V2 in FIG. 2) using the two radio field intensities corresponding to the printer. The CPU 32 then causes the memory 34 to store one or more index values corresponding to one or more of the printers PR1 and PR2.

In S26, the CPU 32 specifies a printer corresponding to the largest index value from among one or more index values in the memory 34 as a short distance printer and causes the memory 34 to store the specifying result. Specifically, the CPU 32 causes the memory 34 to store the Wi-Fi setting information (i.e., an SSID and a password) received from the printer corresponding to the largest index value and the radio field intensity of the latest Advertise signal received from the printer corresponding to the largest index value. In a case where only one index value is stored in the memory 34, i.e., in a case where only one printer is present around the portable terminal TE, the CPU 32 specifies the printer corresponding to the index value as a short distance printer.

In a case where the process of S22 is re-executed after executing S26, the CPU 32 deletes from the memory 34 an older radio field intensity from among the obtained two radio field intensities and causes the memory 34 to store a new radio field intensity. In S24, when the CPU 32 calculates a new index value corresponding to a printer, the CPU 32 deletes the old index value corresponding to the printer from the memory 34 and causes the memory 34 to store the new index value. Moreover, in S26, the CPU 32 deletes the old specifying result from the memory 34 and causes the memory 34 to store a new specifying result (i.e., Wi-Fi setting information and the latest radio field intensity). In this way, the CPU 32 repeatedly executes a process of obtaining a radio field intensity from each printer, calculates an index value, and specify a short distance printer, every unit period (i.e., 0.5 second in the present embodiment).

In S32, the CPU 32 monitors acceptance of a print instruction from the user. The print instruction includes an instruction for selecting a file (i.e., print data) indicating an image of a print target from among a plurality of files (not shown) stored in the memory 34 and an instruction for selecting a button indicating the execution of printing. In a case where the print instruction is accepted, the CPU 32 determines YES in S32 and proceeds to S34.

In S34, the CPU 32 determines whether the radio field intensity (i.e., the latest radio field intensity of the short distance printer) included in the specifying result in the memory 34 is the threshold value or more. In a case of determining that the radio field intensity is the threshold value or more (YES in S34), the CPU 32 proceeds to S40, and in a case of determining that the radio field intensity is less than the threshold (NO in S34), the CPU 32 proceeds to S36. The threshold value in S34 is a relatively small value, but large enough to be capable of detecting that the distance between the portable terminal TE and the short distance printer is significantly large. Since the radio field intensities on sending in the printers may be actually different from each other, it is difficult to correctly set the threshold value. However, when a relatively small threshold value is adopted, and the process of S34 is executed, it can be inhibited that the processes of S40 to S44 are executed using a short distance printer present at the position significantly apart from the portable terminal TE as a target. That is, it can be inhibited that, despite the fact that a user does not desire to cause a printer which is present at the position significantly apart from the portable terminal TE to execute printing, the printing is executed in the printer.

In S36, the CPU 32 causes a display unit 14 to display a notification screen. The notification screen is a screen for notifying the user that a printer, which should execute printing, is at the position significantly apart from the portable terminal TE. Thus, in a case where the user desires to cause the printer to execute printing, the user can carry the portable terminal TE and can come close to the printer. When S36 is finished, the process proceeds to S10.

On the other hand, in S40, the CPU 32 sends the Wi-Fi connection request signal to the short distance printer via a Wi-Fi I/F 20. The Wi-Fi connection request signal is a signal for requesting the short distance printer for the establishment of a wireless connection (hereinafter referred to as the "Wi-Fi connection") in accordance with the Wi-Fi scheme and is specifically an Association Request signal. The Wi-Fi connection request signal includes an SSID included in the specifying result (see S26) in the memory 34, i.e., an SSID of the wireless network in which the short distance printer operates as a parent station.

In S42, the CPU 32 establishes a wireless connection (i.e., a Wi-Fi connection) with the short distance printer via the Wi-Fi I/F 20. Specifically, the CPU 32 executes communication (for example, receiving of the Association Response signal, communication of 4-Way Handshake, and the like) of various signals with the short distance printer via the Wi-Fi I/F 20. In the process of the communication of the various signals, the CPU 32 sends the Wi-Fi setting information (i.e., an SSID and a password) included in the specifying result (see S26) in the memory 34 to the short distance printer and requests the short distance printer for the authentication of the Wi-Fi setting information. As mentioned above, the Wi-Fi setting information sent at that time is Wi-Fi setting information used in the short distance printer. Therefore, the authentication is generally succeeded. As a result, the Wi-Fi connection between the portable terminal TE and the short distance printer is established.

When S42 is executed, a wireless network (hereinafter described as the "Wi-Fi network") of the Wi-Fi scheme in which the short distance printer operates in the G/O state, and the portable terminal TE operates as a so-called legacy is formed. The legacy means a device which joins the Wi-Fi network without executing the operation in accordance with WFD. Since the short distance printer in the G/O state manages the Wi-Fi network, it can be said that the short distance printer in the G/O state is a parent station (in other words, a master device) of the Wi-Fi network. Moreover, since the portable terminal TE which is a legacy joins the Wi-Fi network, it can be said that the portable terminal which is a legacy is a child station (in other words, a slave device) of the Wi-Fi network.

In S44, the CPU 32 sends the printer data selected in S32 to the short distance printer via the Wi-Fi I/F 20 using the Wi-Fi network (i.e., using Wi-Fi connection). As a result, an image represented by the print data is printed on a print medium in the short distance printer. Therefore, the user can obtain the print medium on which printing has been performed from the short distance printer. When S44 is finished, the processes of FIG. 3 are finished.

A configuration where the portable terminal TE sends the print data to the short distance printer using the BT communication is considered. However, the data size of the print data may be large, and the communication speed of the BT communication is slower than the communication speed of the Wi-Fi communication. Therefore, if the configuration of communicating the print data using the BT communication is adopted, the long period of time may be required to communicate the print data. In contrast, in the present embodiment, since the print data is communicated using the Wi-Fi communication, the print data can be communicated promptly.

Specific Case; FIG. 4

A specific case realized by the processes of FIG. 3 is described below with reference to FIG. 4. The BT communication and the Wi-Fi communication, executed between the portable terminal TE and each of the printers PR1 and PR2 are indicated by thin-line arrows and thick-line arrows.

In A1, the printer application 38 is started by the user (the trigger of the processes of FIG. 3). In this case, in T2, the portable terminal TE displays the instruction screen (S10). As a result, in A2, the user starts moving the portable terminal TE.

The portable terminal TE receives an Advertise signal including Wi-Fi setting information indicating the SSID "X1" and the password "PS1" from the printer PR1 in T10 and obtains a radio field intensity M1 of the Advertise signal in T12 (S22). The portable terminal TE further receives an Advertise signal including Wi-Fi setting information indicating the SSID "X2" and the password "PS2" from the printer PR2 in T20 and obtains a radio field intensity M3 of the Advertise signal in T22 (S22). Therefore, two radio field intensities M1 and M3 of the two printers PR1 and PR2 are obtained in the unit term T1 (i.e., 0.5 second).

Subsequently, the portable terminal TE again receives an Advertise signal from the printer PR1 in T30 amid obtains a radio field intensity M2 of the Advertise signal in T32 (the second S22). The portable terminal TE further again receives an Advertise signal from the printer PR2 in T40 and obtains a radio field intensity M4 of the Advertise signal in T42 (S22 second and subsequent thereto). Therefore, in the unit period T2 subsequent to the unit period T1, two radio field intensities M2 and M4 corresponding to the two printers PR1 and PR2 ar obtained.

Subsequently, in T44, the portable terminal TE calculates an index value (for example, V1 in FIG. 2) corresponding to the printer PR1 using the two radio field intensities M1 and M2 corresponding to the printer PR1, calculates an index value (for example, V2) of the printer PR2 using the two radio field intensities M3 and M4 of the printer PR2, and specifies the printer PR1 as a short distance printer PR using the two index values (S26, see the case A in FIG. 2). The portable terminal TE then stores a specifying result indicating Wi-Fi setting information (i.e., an SSID "X1" and a password "PS1") received from the printer PR1 and the radio field intensity M2 of the latest Advertise signal (i.e., an Advertise signal in T30) received from the printer PR1.

The portable terminal TE repeatedly executes processes of T30 to T44 in the unit period subsequent to the unit period T2 (YES in S30, S20 to S26). Therefore, the portable terminal TE stores the latest specifying result. In the present embodiment, the following processes are described below assuming that the latest specifying result indicates the printer PR1 as a short distance printer.

In A3, the user executes a print instruction operation. In this case, the portable terminal TE determines that a print instruction is accepted (YES in S32) and determines that the radio field intensity (for example, M2) in the specifying result is the threshold value or more in T50 (YES in S34). The portable terminal TE then sends a Wi-Fi connection request signal including an SSID "X1" in the specifying result to the printer PR1 in T60 (S40) and establishes the Wi-Fi connection with the printer PR1 using the Wi-Fi setting information i.e., an SSID "X1" and a password "PS1") in the specifying result in T62 (S42).

Subsequently, in T70, the portable terminal TE sends print data to the printer PR1 using the Wi-Fi connection established in T62. As a result, in T72, a print process for printing an image represented by the print data is executed in the printer PR1.

Effect of Present Embodiment

According to the present embodiment, if the portable terminal TE receives Advertise signals (T10, T20, or the like in FIG. 4) via a BT I/F 22 from the printers PR1 and PR2, the portable terminal TE can specify a short distance printer (T44). Thus, it is not required to provide a plurality of antennas for receiving the Advertise signals in a space in which each of the printers PR1 and PR2 is arranged. Specifically, the portable terminal TE does not simply compare the radio field intensity (for example, M1 in T10) of the Advertise signal received from the printer PR1 and the radio field intensity (for example, M3 in T20) of the Advertise signal received from the printer PR2 so as to specify a short distance printer. That is, the portable terminal TE specifies a short distance printer using an index value (for example, V1 in FIG. 2) indicating the ratio of the two radio field intensities M1 and M2 of the two Advertise signals received from the printer PR1 and an index value (for example, V2) indicating the ratio of the radio field intensities M3 and M4 of the two Advertise signals received form the printer PR2. Therefore, for example, even in the condition where the radio field intensity on sending (for example, SM1 in FIG. 2) in the printer PR1 is different from the radio field intensity on sending (for example, SM2) in the printer PR2, the portable terminal TE can appropriately specify the printer PR1 as a short distance printer. As a result, the portable terminal TE can appropriately send a Wi-Fi connection request to the short distance printer and causes the short distance printer to appropriately execute the print process.

Correspondence Relationship

The portable terminal TE, the printer PR1 and the printer PR2 are examples of "communication apparatus", "first external apparatus", "second external apparatus", respectively. The BT scheme and the BT I/F 22 are examples of "first communication scheme" and "first interface" respectively. The Wi-Fi scheme and the Wi-Fi L/F 20 are examples of "second communication scheme" and "second interface" respectively. In FIG. 4, the unit period T1 and the unit period T2 are examples of "first unit period" and "second unit period" respectively. The Advertise signals in T10, T20, T30, and T40 are examples of "first to fourth predetermined signals". The Wi-Fi setting information (i.e., "X1" and "PS1") in each of the Advertise signals in T10 and T30 is an example of "first related information". The Wi-Fi setting information (i.e., "X2" and "PS2") in each of the Advertise signals in T20 and T40 is an example of "second related information". The radio field intensities M1 to M4 in T12, T22, T32, and T44 are examples of "first to fourth radio field intensities". The Wi-Fi setting information (i.e., "X1" and "PS1") in the Advertise signal in T30 is an example of "connection information". The Wi-Fi connection request signal in T60 is an example of "target data". In FIG. 2, the index value V1 (or V1') and the index value V2 (or V2') are examples of "first value" and "second value" respectively. Specifying a short distance printer is an example of "specifying relationship". In FIG. 3, the instruction screen in S10 and the print instruction in S32 are examples of "instruction screen" and "sending instruction" respectively.

Second Embodiment

Differences from the first embodiment are described. As shown in FIG 1, in the present embodiment, the memory 34 of the portable terminal TE stores the first printer application 38A and the second printer application 38B. The applications 38A and 38B are provided by a vender of the printers PR1 and PR2 in the same way as the first embodiment. The first printer application 38A is a so-called resident application for executing a process for specifying a short distance printer and is always running while the power of the portable terminal TE is ON. The second printer application 38B is started by a user when the user desires to cause the short distance printer to execute a print function.

Process of Portable Terminal TE; FIG. 5

In the present embodiment, the CPU 32 of the portable terminal TE executes processes of FIG. 5 as a substitute for the processes of FIG. 3. When the first printer application 38A is started, i.e., the power of the portable terminal TE is turned ON, the CPU 32 executes processes of S12 to S30 according to the first printer application 38A. The processes of S12 to S30 are the same as those in FIG. 3. Thus, in a case where a value of the acceleration sensor is a threshold value or more (YES in S12), the CPU 32 repeats the processes (S20 to S26) of specifying a short distance printer and causing the memory 34 to store an specifying result.

On the other hand, in a case where the second printer application 38B is started, the CPU 32 executes the processes of S32 to S44 according to the second printer application 38B. The processes of S32 to S44 are the same as those in FIG. 3. Thus, in a case where the CPU 32 accepts the print instruction from the user (YES in S32), the CPU 32 can execute processes of S34 and S40 to S44 using the latest specifying result (see S26) stored in the memory 34 by the first printer application 38A.

Even in the present embodiment, the same operation as in FIG. 4 can be realized. That is, in A1 of FIG. 4, when the power of the portable terminal TE is turned ON, the first printer application 38A is started. However, the portable terminal TE omits displaying the instruction screen in T2 of FIG. 4. After the first printer application 38A is started, the second printer application 38B is started by the user. Thereafter, the print instruction operation in A3 is executed.

Effect of the Present Embodiment

Also in the present embodiment, the portable terminal TE can appropriately specify a short distance printer in the same way as the first embodiment. Moreover, in the first embodiment, the user is required to move the portable terminal TE according to the instruction screen (see S10 of FIG. 3) after starting the printer applications 38. In contrast, in the present embodiment, the portable terminal TE repeats the processes of specifying a short distance printer according to the first printer application 38A while the power is ON. Therefore, the user is not required to move the portable terminal TE after starting the second printer application 38B. Therefore, in a case of accepting the print instruction, the portable terminal TE can promptly establish the Wi-Fi connection with the short distance printer using the stored specifying result. That is, the portable terminal TE can promptly send the print data to the short distance printer. As a result, the portable terminal TE can cause the short distance printer to promptly execute printing. In the present embodiment, the first printer application 38A and the second printer application 38B are examples of "first computer program", and "second computer program" respectively.

Variation 1

For example, the Advertise signals sent from the printers PR1 and PR2 do not include Wi-Fi setting information and may include the name of a source printer. The portable terminal TE then displays the name of the short distance printer specified in S26 of FIG. 3 and may not execute the processes of S32 to S44, In this case, the user can know the short distance printer by looking at the name of the short distance printer and can come close to the short distance printer. The user obtains the Wi-Fi setting information (i.e., an SSID and a password) by looking at the Wi-Fi setting information displayed on the short distance printer. Subsequently, the user causes the portable terminal TE to execute the following processes by using an application which is different from the printer applications 38. That is, the portable terminal TE sends a Probe Request signal via a Wi-Fi I/F 20 and receives, from each of one or more printers, a Probe Response signal including an SSID of the printer, and displays the one or more SSIDs. In this case, the user selects the SSID of the short distance printer from the one or more SSIDs and inputs the password of the short distance printer to the portable terminal TE. As a result, the portable terminal TE sends a Wi-Fi connection request signal including the selected SSID to the short distance printer, establishes a Wi-Fi connection with the short distance printer using the input password, and sends the print data to the short distance printer using the Wi-Fi connection. In the present variation, the name of the short distance printer displayed on the portable terminal TE is an example of "target data" and "obtaining of connection information" can be omitted. Moreover, the establishment of the Wi-Fi connection and the sending of the printer data are realized by an application different from the printer applications 38, and thus, "establishing" and "sending of print data" can be omitted. In the present variation, the name of the printer PR1 in the Advertise signal sent from the printer PR1 and the name of the printer PR2 in the Advertise signal sent from the printer PR2 are examples of "first related information", and "second related information" respectively. In other variations, the Advertise signal sent from each of the printers PR1 and PR2 may include specifying information such as a model name, an IP address, a MAC address, and the like of the source printer as a substitute for the name of the source printer. In the present variation, the specifying information is examples of the "first related information" and the "second related information".

Variation 2

The portable terminal TE may specify a long distance printer farthest from the portable terminal TE and display the name of the long distance printer, for example. In this case, for example, the user can execute an operation for causing a printer which is different from the long distance printer to execute printing so as not to cause the long distance printer to execute printing. Generally, the "communication apparatus" is only required to specify a relationship between: the distance between the communication apparatus and the first external apparatus; and the distance between the communication apparatus and the second external apparatus, and output target data using the specified relationship.

Variation 3

The portable terminal TE may not establish the Wi-Fi connection with the short distance printer, and may send a BT connection request signal for establishing the BT connection (i.e., the logical link of the BT scheme) to the short distance printer so as to establish the BT connection with the short distance printer. In this case, the portable terminal TE may send print data to the short distance printer using the BT connection. In the present variation, the BT connection request signal is examples of "wireless connection request" and "target data", and the "communication apparatus" may not comprise the "second interface".

Variation 4

The Advertise signal may not include Wi-Fi setting information. In this case, for example, the portable terminal TE may send a Scan Request signal of the BT scheme to the short distance printer and receives the Scan Response signal including Wi-Fi setting information from the short distance printer after specifying the short distance printer. The Scan Request signal and the Scan Response signal are signals communicated between the portable terminal TE and the short distance printer by not executing communication of the highest layer for establishing the logical link (i.e., the BT connection) of the BT scheme and executing communication of the layer lower than the highest layer. In other variations, for example, the portable terminal TE may establish a BT connection with the short distance printer and may receive Wi-Fi setting information from the short distance printer using the BT connection after specifying the short distance printer. The present variation also is an example of "obtaining of connection information".

Variation 5

The portable terminal TE may not obtain the radio field intensities of the Advertise signals. For example, the portable terminal TE may receive the Scan Request signal repeatedly sent from each of the printers PR1 and PR2 so as to obtain the radio field intensities of the signal or may establish a BT connection with each of the printers PR1 and PR2 and receive a presence conformation signal using the BT connection so as to obtain the radio field intensity of the signal. Generally, the "communication apparatus" is only required to receive any signal from the first (or second) external apparatus via the first interface so as to obtain the radio field intensity of the signal.

Variation 6

In FIGS. 3 and 5, at least one of the processes of S10, S12, S34, and S36 may be omitted. That is, at least one of the "detecting", the "determining" and the "causing a display unit of the communication apparatus to display" may be omitted.

Variation 7

In FIG. 3, in a case of determining YES in S32, the portable terminal TE executes S10 to S30 and specifies a short distance printer and may thereafter execute processes of S34 to S44. Generally, the "communication apparatus" may execute a combination process before receiving a sending instruction from the user as shown in FIG. 3 or may execute a combination process after receiving a sending instruction from the user as shown in the present variation. In the present variation, the processes of S24 and S26 may not be executed repeatedly. Generally, the "communication apparatus" may not repeatedly execute the combination process.

Variation 8

In each of the above embodiments, the portable terminal TE obtains the radio field intensities M1 and M3 corresponding to the two printers PR1 and PR2 in the first unit period T1 of FIG. 4 and thereafter obtain the radio field intensities M2 and M4 corresponding to the two printers PR1 and PR2 in the second unit period T2. As a substitute for it, the portable terminal TE may obtain the radio field intensities M1 and M2 corresponding to the one printer PR1 in the first unit period T1, calculate an index value corresponding to the printer PR1, obtain the radio field intensities M3 and M4 corresponding to the printer PR2 in the second unit period T2, and calculate an index value corresponding to the printer PR2. Generally, the "communication apparatus" may obtain the first and the third radio field intensities in the first unit period and the second and the fourth radio field intensities in the second unit period as in each of the embodiments or may obtain the first and the second radio field intensities in the first unit period and the third and the fourth radio field intensities in the second unit period as in the present variation.

Variation 9

In each of the above embodiments, the portable terminal TE calculates an index value using a radio field intensity (for example, M1) obtained in the first unit period T1 and a radio field intensity (for example, M2) obtained in the second unit period T2 subsequent to the first unit period T1. However, the portable terminal TE may not calculate an index value using the radio field intensities obtained in the consecutive two unit periods. For example, the portable terminal TE may calculate an index value using a radio field intensity obtained in the first unit period T1 and a radio field intensity obtained in the third unit period subsequent to the second unit period T2. For example, the portable terminal TE may calculate an index value using a radio field intensity obtained in the second unit period T2 and a radio field intensity obtained in the fourth unit period subsequent to the third unit period.

Variation 10

The "first interface" may not be an I/F for executing BT communication and may be, for example, an I/F for executing wireless communication in accordance with to another communication scheme (for example, TransferJet (registered trademark) scheme) which can execute wireless communication. The "second interface" may not be an I/F for executing Wi-Fi communication and may be an I/F for wireless communication in accordance with another communication scheme which can establish wireless LAN.

Variation 11

The "communication apparatus" may not be a portable terminal and may he any of other devices (for example, a printer, a scanner, a copier, a facsimile, a telephone, a desktop PC, a server, and the like). The "first (or second) external apparatus" may not be a printer and may be, for example, a scanner. In this case, the portable terminal TE may receive scan data from a short distance scanner in S44 of FIGS. 3 and 5. The "first (or second) external apparatus" may be any of devices (for example, a copier, a facsimile, a telephone, a PC, a server, a portable terminal, and the like) different from the printer and the scanner.

Variation 12

In each of the embodiments, the CPU 32 of the portable terminal TE realizes the processes of FIGS. 2 to 5 by executing a program (i.e., software). As a substitute for it, at least one of the processes of FIGS. 2 to 5 may be achieved by hardware such as a logical circuit or the like.

What is claimed is:

1. A non-transitory computer-readable storage medium storing computer-readable instructions for a communication apparatus,
wherein the computer-readable instructions, when executed by a processor of the communication apparatus, cause the communication apparatus to perform:
obtaining a first radio field intensity of a first predetermined signal by receiving the first predetermined signal from a first external apparatus via a first interface of the communication apparatus, the first interface being an interface for executing a wireless communication in accordance with a first communication scheme;
obtaining a second radio field intensity of a second predetermined signal by receiving the second predetermined signal from the first external apparatus via the first interface after receiving the first predetermined signal;

calculating a first value indicating a ratio of the first radio field intensity and the second radio field intensity;

obtaining a third radio field intensity of a third predetermined signal by receiving the third predetermined signal from a second external apparatus different from the first external apparatus via the first interface;

obtaining a fourth radio field intensity of a fourth predetermined signal by receiving the fourth predetermined signal from the second external apparatus via the first interface after receiving the third predetermined signal;

calculating a second value indicating a ratio of the third radio field intensity and the fourth radio field intensity;

specifying a relationship between a first distance and a second distance by usine the first value and the second value, the first distance being a distance between the communication apparatus and the first external apparatus, and the second distance being a distance between the communication apparatus and the second external apparatus; and outputting target data of an output target by using the specified relationship.

2. The non-transitory computer-readable storage medium as in claim 1, wherein p1 the specifying of the relationship includes specifying, from among the first external apparatus and the second external apparatus, a short distance external apparatus which is near the communication apparatus, the outputting of the target data includes sending the target data to the short distance external apparatus, the target data being a wireless connection request for establishing a wireless connection between the communication apparatus and the short distance external apparatus, and the computer-readable instructions, when executed by the processor of the communication apparatus, further cause the communication apparatus to perform:
establishing the wireless connection between the communication apparatus and the short distance external apparatus in response to sending the target data which is the wireless connection request to the short distance external apparatus.

3. The non-transitory computer-readable storage medium as in claim 2, wherein
the outputting of the target data includes sending the target data which is the wireless connection request to the short distance external apparatus via a second interface of the communication apparatus, the second interface being for executing a wireless communication in accordance with a second communication scheme different from the first communication scheme, and
the wireless connection between the communication apparatus and the short distance external apparatus is established via the second interface.

4. The non-transitory computer-readable storage medium as in claim 3, wherein
the computer-readable instructions, when executed by the processor of the communication apparatus, further cause the communication apparatus to perform:
obtaining, via the first interface, connection information for establishing the wireless connection from the short distance external apparatus, and
the establishing of the wireless connection is performed by using the connection information.

5. The non-transitory computer-readable storage medium as in claim 3, wherein
each of the first external apparatus and the second external apparatus is capable of performing a print function;
a communication speed of a wireless communication via the second interface is faster than a communication speed of a wireless communication via the first interface, and
the computer-readable instructions, when executed by the processor of the communication apparatus, further cause the communication apparatus to perform:
sending print data representing an image to be printed to the short distance external apparatus via the second interface by using the wireless connection.

6. The non-transitory computer-readable storage medium as in claim 3, wherein
the first communication scheme is Bluetooth (registered trademark) scheme, and
the second communication scheme is Wi-Fi scheme.

7. The non-transitory computer-readable storage medium as in claim 2, wherein
a combination process including the obtaining of the first radio field intensity, the obtaining of the second radio field intensity, the calculating of the first value, the obtaining of the third radio field intensity, the obtaining of the fourth radio field intensity, the calculating of the second value, and the specifying of the relationship, is performed before accepting a sending instruction for sending the wireless connection request from a user, and
the outputting of the target data which is the wireless connection request is performed in a case of accepting the sending instruction from the user.

8. The non-transitory computer-readable storage medium as in claim 7, wherein
the computer-readable instructions include:
a first instruction for causing the communication apparatus to perform the combination process; and
a second instruction for causing the communication apparatus to perform the outputting of the target data which is the wireless connection request,
the combination process is performed in a case where the first computer instruction is activated, and
the outputting of the target data which is the wireless connection request is performed in a case where the second computer instruction is activated and the sending instruction is accepted from the user.

9. The non-transitory computer-readable storage medium as in claim 2, wherein
the computer-readable instructions, when executed by the processor of the communication apparatus, further cause the communication apparatus to perform:
determining, after the short distance external apparatus has been specified, whether a radio field intensity of the predetermined signal that has been obtained from the short distance external apparatus is equal to or higher than a threshold value,
wherein the outputting of the target data which is the wireless connection request is performed in a case where it is determined that the radio field intensity of the predetermined signal is equal to or higher than the threshold value, and
the outputting of the target data which is the wireless connection request is not performed in a case where it is determined that the radio field intensity of the predetermined signal is lower than the threshold value.

10. The non-transitory computer-readable storage medium as in claim 1, wherein
a combination process including the obtaining of the first radio field intensity, the obtaining of the second radio field intensity, the calculating of the first value, the obtaining of the third radio field intensity, the obtaining of the fourth radio field intensity, the calculating of the second value, and the specifying of the relationship, is performed repeatedly,
the computer-readable instructions, when executed by the processor of the communication apparatus, further cause the communication apparatus to perform:
storing, in a memory of the communication apparatus, information indicating the relationship which has been specified by the specifying of the relationship included in a latest combination process, and
the outputting of the target data is performed by using the information in the memory.

11. The non-transitory computer-readable storage medium as in claim 1, wherein
the receiving of the first predetermined signal and the receiving of the third predetermined signal are performed during a first unit period, and
the receiving of the second predetermined signal and the receiving of the fourth predetermined signal are performed during a second unit period after the first unit period.

12. The non-transitory computer-readable storage medium as in claim 1, wherein
the computer-readable instructions, when executed by the processor of the communication apparatus, further cause the communication apparatus to perform:
detecting a movement of the communication apparatus,
wherein a combination process including the obtaining of the first radio field intensity, the obtaining of the second radio field intensity, the calculating of the first value, the obtaining of the third radio field intensity, the obtaining of the fourth radio field intensity, the calculating of the second value, and the specifying of the relationship, is started when the movement of the communication apparatus is detected.

13. The non-transitory computer-readable storage medium as in claim 1, wherein
the computer-readable instructions, when executed by the processor of the communication apparatus, further cause the communication apparatus to perform:
causing a display unit of the communication apparatus to display an instruction screen for instructing a user to move the communication apparatus,
wherein a combination process including the obtaining of the first radio field intensity, the obtaining of the second radio field intensity, the calculating of the first value, the obtaining of the third radio field intensity, the obtaining of the fourth radio field intensity, the calculating of the second value, and the specifying of the relationship, is started after the instruction screen has been displayed on the display unit.

14. The non-transitory computer-readable storage medium as in claim 1, wherein
the obtaining of the first field intensity value and the obtaining of the second field intensity value are performed by receiving the first predetermined signal and the second predetermined signal included in a plurality of predetermined signals repeatedly sent from the first external apparatus, each of the plurality of predetermined signals sent from the first external apparatus includes first related information which is related to the first external apparatus,
the obtaining of the third field intensity value and the obtaining of the fourth field intensity value are performed by receiving the third predetermined signal and the fourth predetermined signal included in a plurality of predetermined signals repeatedly sent from the second external apparatus, and
each of the plurality of predetermined signals sent from the second external apparatus includes second related information which is related to the second external apparatus.

15. The non-transitory computer-readable storage medium as in claim 1, wherein
the first predetermined signal and the second predetermined signal are received from the first external apparatus via the first interface, without a communication using a highest layer for establishing a logical link of the first communication scheme, by a communication of a lower layer which is lower than the highest layer, and
the third predetermined signal and the fourth predetermined signal are received via the first interface from the second external apparatus, without the communication using the highest layer, by the communication of the lower layer.

16. A communication apparatus comprising:
a processor; and
a memory storing computer-readable instructions therein, the computer-readable instructions, when executed by the processor, causing the communication apparatus to perform:
obtaining a first radio field intensity of a first predetermined signal by receiving the first predetermined signal from a first external apparatus via a first interface of the communication apparatus, the first interface being an interface for executing a wireless communication in accordance with a first communication scheme;
obtaining a second radio field intensity of a second predetermined signal by receiving the second predetermined signal from the first external apparatus via the first interface after receiving the first predetermined signal;
calculating a first value indicating a ratio of the first radio field intensity and the second radio field intensity;
obtaining a third radio field intensity of a third predetermined signal by receiving the third predetermined signal from a second external apparatus different from the first external apparatus via the first interface;
obtaining a fourth radio field intensity of a fourth predetermined signal by receiving the fourth predetermined signal from the second external apparatus via the first interface after receiving the third predetermined signal;
calculating a second value indicating a ratio of the third radio field intensity and the fourth radio field intensity;
specifying a relationship between a first distance and a second distance by using the first value and the second value, the first distance being a distance between the communication apparatus and the first external apparatus, and the second distance being a distance between the communication apparatus and the second external apparatus; and outputting target data of an output target by using the specified relationship.

17. A method performed by a communication apparatus, the method comprising:

obtaining a first radio field intensity of a first predetermined signal by receiving the first predetermined signal from a first external apparatus via a first interface of the communication apparatus, the first interface being an interface for executing a wireless communication in accordance with a first communication scheme;

obtaining a second radio field intensity of a second predetermined signal by receiving the second predetermined signal from the first external apparatus via the first interface after receiving the first predetermined signal;

calculating a first value indicating a ratio of the first radio field intensity and the second radio field intensity;

obtaining a third radio field intensity of a third predetermined signal by receiving the third predetermined signal from a second external apparatus different from the first external apparatus via the first interface;

obtaining a fourth radio field intensity of a fourth predetermined signal by receiving the fourth predetermined signal from the second exte apparatus via the first interface after receiving the third predetermined signal;

calculating a second value indicating a ratio of the third radio field intensity and the fourth radio field intensity;

specifying a relationship between a first distance and a second distance by using the first value and the second value, the first distance being a distance between the communication apparatus and the first external apparatus, and the second distance being a distance between the communication apparatus and the second external apparatus; and outputting target data of an output target by using the specified relationship.

* * * * *

UNITED STATES PATENT AND TRADEMARK OFFICE
CERTIFICATE OF CORRECTION

PATENT NO. : 9,585,183 B2
APPLICATION NO. : 15/078135
DATED : February 28, 2017
INVENTOR(S) : Satoshi Suzuki It is certified that error appears in the above-identified patent and that said Letters Patent is hereby corrected as shown below:

In the Claims

Column 17, Claim 1, Line 18 should read: second distance by using the first value and the Column 17, Claim 2, Line 27 should read: as in claim 1, wherein the specifying of the relationship Column 22, Claim 17, Line 7 should read: signal from the second external apparatus via the first Signed and Sealed this
Twentieth Day of March, 2018

Andrei Iancu
*Director of the United States Patent and Trademark Office*